US010383285B2

(12) United States Patent
Simmons et al.

(10) Patent No.: US 10,383,285 B2
(45) Date of Patent: Aug. 20, 2019

(54) ACCUMULATOR SYSTEM FOR ROUND BALER BELT PRE-TENSION

(71) Applicant: CNH Industrial America LLC, New Holland, PA (US)

(72) Inventors: Scott C. Simmons, Lititz, PA (US); Michael J. Cooper, North Yorkshire (GB); Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 277 days.

(21) Appl. No.: 15/466,166

(22) Filed: Mar. 22, 2017

(65) Prior Publication Data

US 2017/0188520 A1    Jul. 6, 2017

Related U.S. Application Data

(62) Division of application No. 13/467,129, filed on May 9, 2012, now Pat. No. 9,622,419.

(51) Int. Cl.
| | |
|---|---|
| *A01F 15/08* | (2006.01) |
| *A01F 15/07* | (2006.01) |
| *A01F 15/18* | (2006.01) |

(52) U.S. Cl.
CPC .............. *A01F 15/18* (2013.01); *A01F 15/07* (2013.01); *A01F 15/0825* (2013.01); *A01F 15/0833* (2013.01); *A01F 2015/077* (2013.01)

(58) Field of Classification Search
CPC ...... A01F 15/18; A01F 15/07; A01F 15/0833; A01F 15/0825; A01F 2015/077
USPC ............... 100/76, 87, 88, 89; 56/10.2 R, 341
See application file for complete search history.

(56) References Cited

U.S. PATENT DOCUMENTS

| | | |
|---|---|---|
| 3,751,890 A | 8/1973 | Gay et al. |
| 3,763,636 A | 10/1973 | Bliss |
| 4,257,219 A * | 3/1981 | Burrough ............ A01F 15/0833 100/88 |
| 4,280,320 A | 7/1981 | Eggers |
| 4,391,187 A | 4/1983 | Koning et al. |
| 4,417,436 A | 11/1983 | Campbell |
| 4,545,298 A | 10/1985 | Viaud |
| 4,698,955 A | 10/1987 | Wagstaff |
| 4,870,812 A | 10/1989 | Jennings et al. |
| 4,899,651 A | 2/1990 | Lausch et al. |
| 4,912,918 A | 4/1990 | Jennings et al. |

(Continued)

FOREIGN PATENT DOCUMENTS

| | | |
|---|---|---|
| EP | 0364042 A1 | 4/1990 |
| EP | 0875136 A2 | 4/1998 |
| EP | 1008292 A1 | 6/2000 |

*Primary Examiner* — Jimmy T Nguyen
(74) *Attorney, Agent, or Firm* — Patrick M. Sheldrake; Peter K. Zacharias

(57) ABSTRACT

An improved belt tensioning system for an agricultural round baler that increases belt tension to reduce slippage between the belts and the driving rolls during the initial stage of a bale forming cycle when the bale chamber is empty and as the belts are beginning to be rolled. The system includes an accumulator that is pressurized by the tensioning system as a bale is being formed. The accumulator pressure may then be directed to a hydraulic cylinder included in a bale density system to increase tension in the belts after a completed bale is ejected and the bale chamber is being reset for the next bale.

9 Claims, 4 Drawing Sheets

(56) References Cited

U.S. PATENT DOCUMENTS

| | | |
|---|---|---|
| 5,025,717 A | 6/1991 | Viaud et al. |
| 5,025,718 A | 6/1991 | Viaud et al. |
| 5,165,332 A * | 11/1992 | Lee ................... A01F 15/0833 100/40 |
| 5,263,410 A * | 11/1993 | Olin ................... A01F 15/0883 100/88 |
| 5,367,865 A | 11/1994 | Jennings et al. |
| 5,622,104 A | 4/1997 | Viesselmann et al. |
| 5,813,204 A | 9/1998 | Pecenka et al. |
| 5,875,709 A | 3/1999 | Tertilt |
| 6,079,324 A | 6/2000 | Feraboli et al. |
| 6,094,900 A | 8/2000 | Underhill et al. |
| 6,332,309 B1 | 12/2001 | Rodewald |
| 6,530,311 B1 | 3/2003 | Wilkens et al. |
| 6,581,364 B2 | 6/2003 | Lucand et al. |
| 6,622,468 B2 | 9/2003 | Lucand et al. |
| 6,640,699 B2 | 11/2003 | Viaud |
| 7,171,892 B2 | 2/2007 | Viaud |
| 9,295,198 B2 | 3/2016 | Simmons et al. |
| 9,622,419 B2 * | 4/2017 | Simmons ............ A01F 15/0833 |
| 2005/0028688 A1 | 2/2005 | Derscheid |

\* cited by examiner

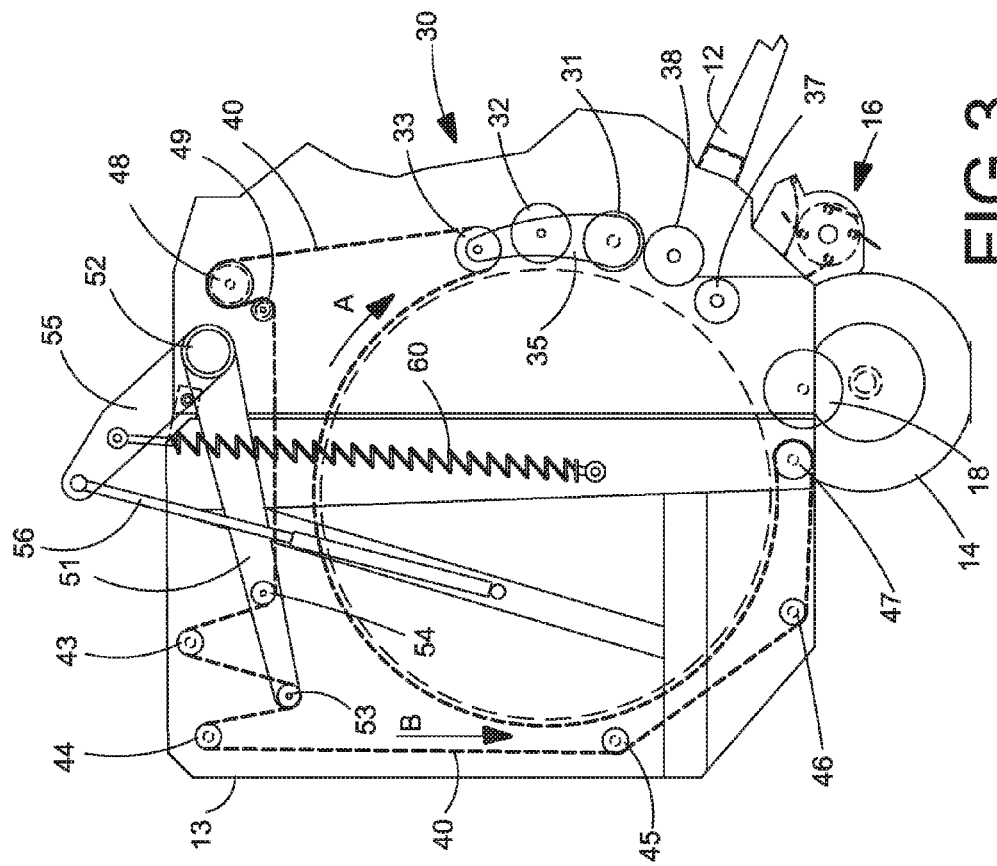
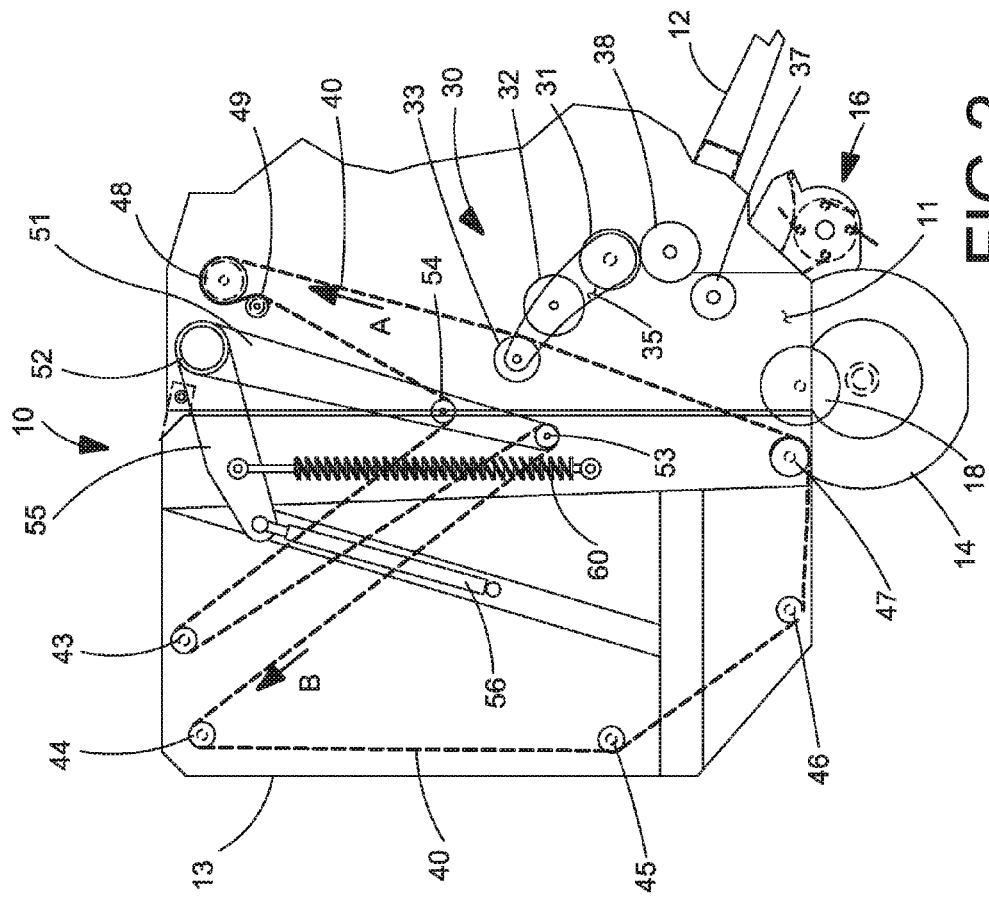

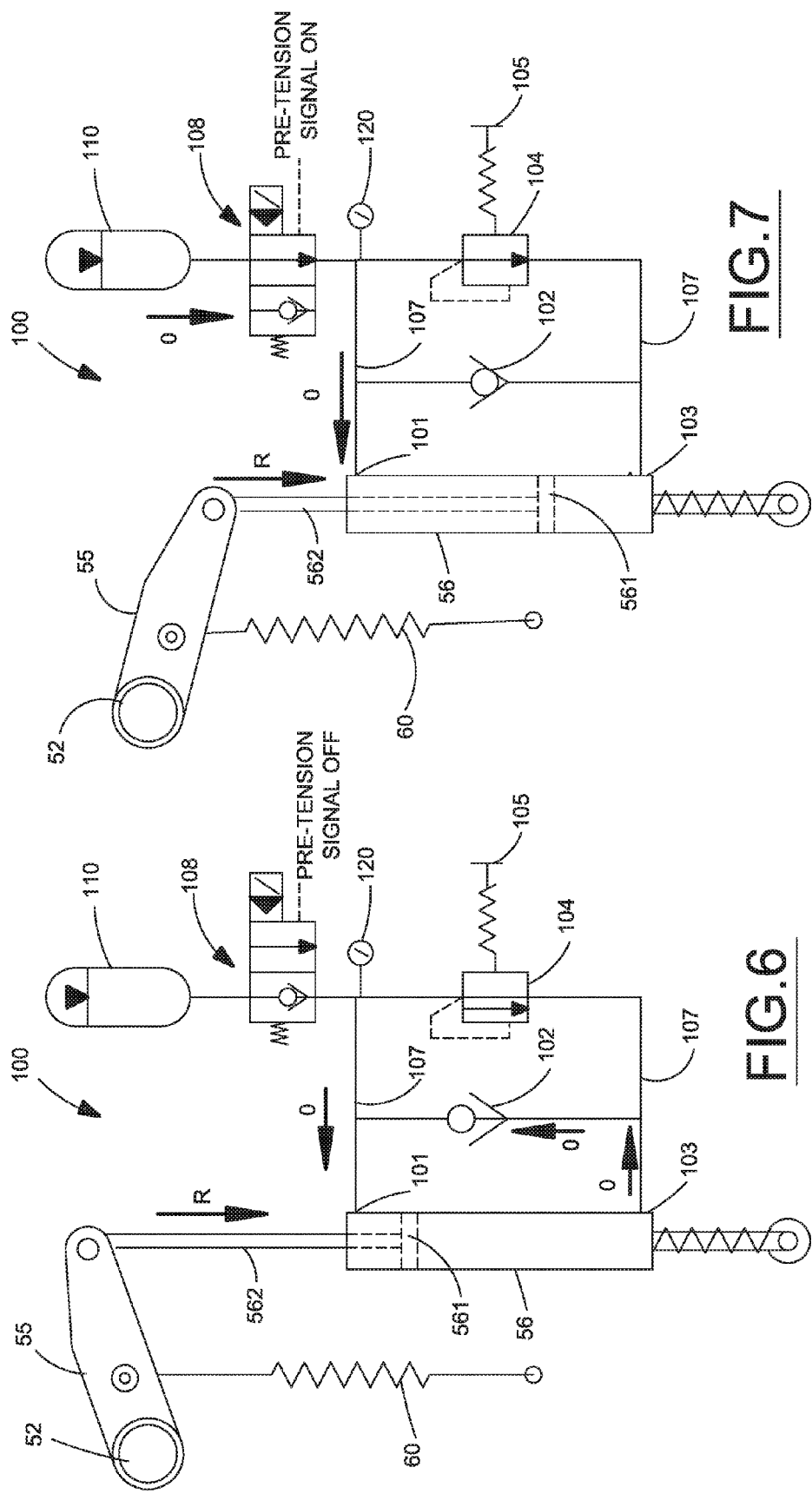

ACCUMULATOR SYSTEM FOR ROUND BALER BELT PRE-TENSION

CROSS REFERENCE TO RELATED APPLICATION

This application is a divisional of U.S. patent application Ser. No. 13/467,129, entitled "Accumulator System for Round Baler Belt Pre-Tension" and filed May 9, 2012, the contents of which are incorporated herein by reference.

FIELD OF THE INVENTION

The present invention relates generally to agricultural round balers which form cylindrical bales using one or more movable belts and/or rollers disposed in a bale-forming chamber and, more particularly to an improved system for tensioning the movable belts.

BACKGROUND OF THE INVENTION

Round balers have become quite prevalent for their capability of producing a conveniently sized cylindrical bale, very often automatically wrapped with a sheeting material such as net or film. Crop material, such as hay, is picked up from the ground as the baler travels across the field, and is fed into an expandable chamber where it is rolled up to form a compact cylindrical hay package.

Prior art round balers generally have an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms multiple of guide rolls are journalled. A biasing force is applied on the take up arms to urge the outer surfaces of the guide rolls against the belts to maintain belt tension and prevent slack from occurring in the belts during expansion and contraction of the chamber.

It is known to provide a round baler density system to apply increased tension on the belts in order to create a densely packed bale. A hydraulic density cylinder with a controlled fluid release limits the rate of bale chamber expansion and provides a degree of crop compaction during baling. The amount of compaction may be varied by adjusting the fluid release rate, often in the form of a pressure relief valve which restricts the extension of the density cylinder by forcing fluid through a variable relief. When the bale reaches a desired size and is discharged, mechanical springs acting on the take up arms are typically employed to return the hydraulic cylinder to its initial position and provide a biasing force on the take up arms so a new bale forming cycle may commence.

Problems arise when the baler is used on silage crops which typically have higher moisture content and are suppler. The additional moisture reduces the friction coefficient between the belts and the drive roll. The supple crop has a tendency to build up on the rollers and scrapers in the baler, increasing friction and requiring more power to turn the belts. The combination increases incidence of belt slipping, making the task of commencing the bale-forming cycle by rolling the then-stationary belts all the more difficult.

It would be desirable to provide a system that would increase the tension in the belts to improve belt rolling during the initial phase of bale formation. Additional advantages would be realized by a system that would selectively increase belt tension during the bale initial phase yet allow use of the current bale density systems once the bale forming process is under way. Still further advantages would be realized through an improved belt tensioning system that could be easily implemented on existing bale tensioning systems without requiring a dramatic changes to the bale tensioning system.

SUMMARY OF THE INVENTION

Accordingly, the present invention, in any of the embodiments described herein, may provide one or more of the following advantages:

It is an object of the present invention to provide an improved belt tensioning system for an agricultural round baler that increases belt tension during the initial stage of a bale forming cycle when the bale chamber is empty and as the belts are beginning to be rolled.

It is a further object of the present invention to provide an improved belt tensioning system for an agricultural round baler that is selectively adjustable to suit a variety of operating conditions caused by various crop materials.

It is a further object of the present invention to provide an improved belt tensioning system for an agricultural round baler that does not interfere with the core forming portion of the bale forming cycle.

It is a further object of the present invention to provide an improved belt tensioning system for an agricultural round baler that is easily retrofit onto existing round balers having bale density systems.

It is a still further object of the present invention to provide an improved belt tensioning system for an agricultural round baler having a bale density system that is durable in construction, inexpensive of manufacture, carefree of maintenance, easily assembled, and simple and effective to use.

These and other objects are achieved according to the instant invention by providing an improved belt tensioning system for an agricultural round baler that increases belt tension to reduce slippage between the belts and the driving rolls during the initial stage of a bale forming cycle when the bale chamber is empty and as the belts are beginning to be rolled. The system includes an accumulator that is pressurized by the tensioning system as a bale is being formed. The accumulator pressure is then directed to a hydraulic cylinder included in a bale density system to increase tension in the belts after a completed bale is ejected and the bale chamber is being reset for the next bale.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown like numerals indicate like elements throughout the drawings. In the drawings:

The advantages of this invention will be apparent upon consideration of the following detailed disclosure of the invention, especially when taken in conjunction with the accompanying drawings wherein:

FIG. 2 is a side section view of the round baler of FIG. 1 showing a bale forming chamber configured at the beginning of a bale forming cycle;

FIG. 3 is a side view of the agricultural round baler in FIG. 1 in which the bale forming chamber is configured as it would be near the end of a bale forming cycle;

FIG. 6 is a diagrammatic view of a bale tension system incorporating the present invention shown configured as it would be after the bale has been ejected from the bale forming chamber and the belt tension arms are retracting; and FIG. 7 is a diagrammatic view of a bale tension system incorporating the present invention shown configured as it would be after the bale has been ejected from the bale forming chamber and the belt tension arms have fully retracted and pre-tensioning of the belts is applied.

DETAILED DESCRIPTION OF THE INVENTION

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
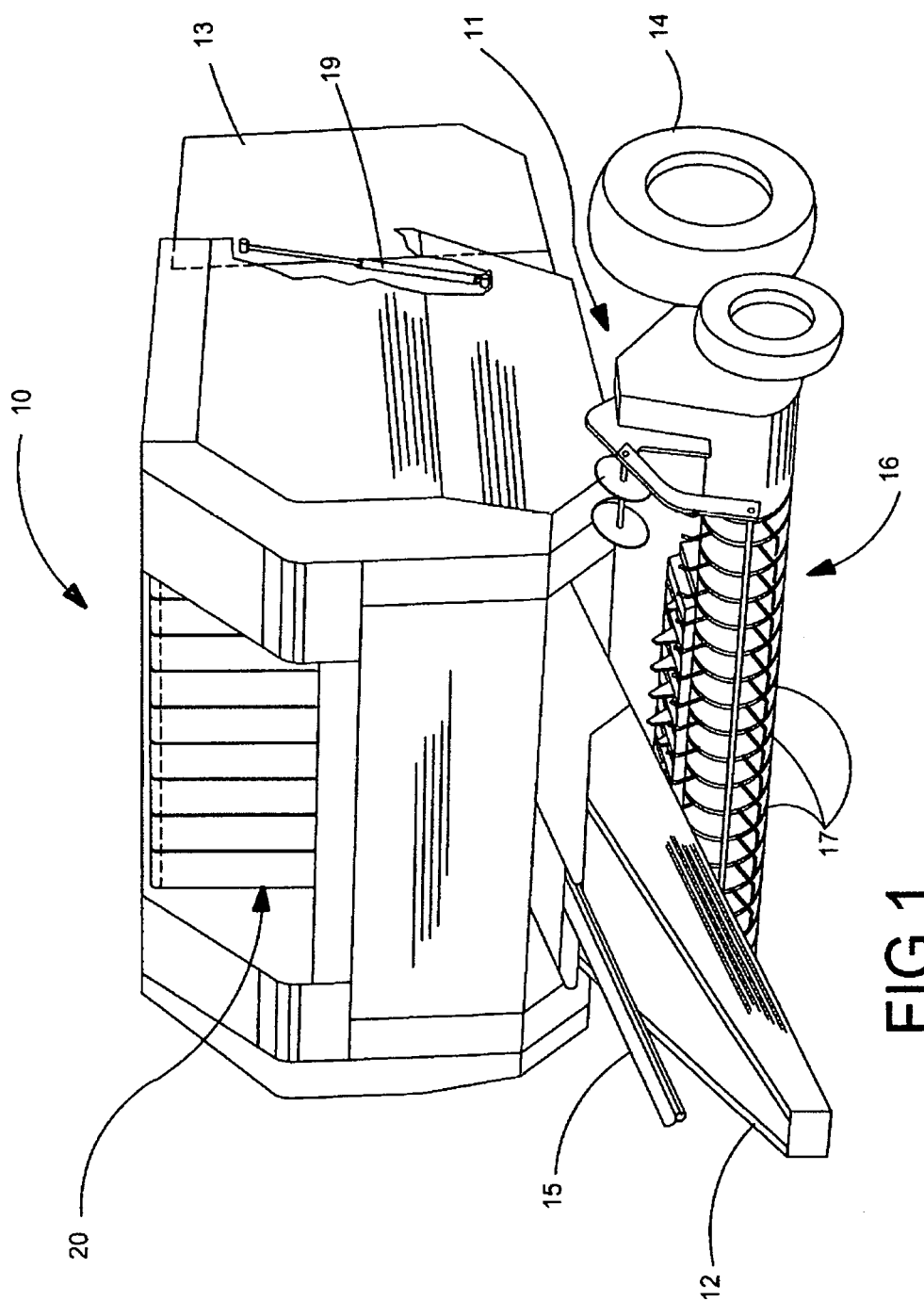
FIG. 1 is a perspective view of a typical agricultural round baler on which the present invention is useful.

Referring to the figures, a generally well-known round baler 10 which incorporates the preferred embodiment of the present invention, includes a main frame 11 supported by a pair of wheels 14 (only one shown). A tongue 12 is provided for connection to a tractor. Pivotally connected to the sides of main frame 11 is tailgate 13 which may be closed (as shown in FIG. 1) during bale formation or pivoted open by tailgate actuator 19 to discharge a completed bale. A conventional pickup 16, mounted on main frame 11, includes a plurality of tines 17 movable in a predetermined path to lift crop material from the ground and deliver it rearwardly toward a rotatably mounted floor roll 18.

A chamber 20 for forming bales is defined partly by a sledge assembly 30 comprising a plurality of rollers 31, 32 extending transversely in the arcuate arrangement shown in FIGS. 2 and 3. Rollers 31, 32 are journalled at their ends in a pair of spaced apart arms 35, one of which is shown. These arms are pivotally mounted inside main frame 11 on stub shafts for providing movement of sledge assembly 30 between the bale starting position shown in FIG. 2 and the full bale position shown in FIG. 3. Rollers 31, 32 are driven in a clockwise direction by conventional means (i.e., chains and sprockets or gears) connected to and powered by a prime mover via a drive shaft 15. A freely rotatable idler roller 33 is also carried by arms 35. Additionally, a starter roll 37, and a fixed roll 38 are located adjacent to roller 31, and are also driven in a clockwise direction by the conventional means.

The bale forming chamber is further defined by an apron 40 comprising a plurality of continuous side-by-side belts supported by guide rolls 43, 44, 45, 46, 47 rotatably mounted in tailgate 13 and a drive roll 48, mounted on main frame 11. Apron 40 passes between roller 32 on sledge assembly 30 and idler roller 33, and is in engagement only with idler roller 33 and not roller 32 which is located in close proximity to the apron belts to strip crop material from the belts, in addition to its bale forming function. Drive roll 48 is powered via a power take-off from the tractor and a drive train (not shown) which moves apron 40 along its changing path, indicated generally by arrows A and B in FIGS. 2 and 3. An additional guide roll 49 ensures proper driving engagement between apron 40 and drive roll 48.

A pair of take up arms 51 (only one shown) are mounted to pivot conjointly with a cross shaft 52 between inner and outer positions, shown in FIGS. 2 and 3, respectively, and carry additional guide rolls 53, 54 for supporting apron 40. Belt tension lever arm 55 is also affixed to shaft 52 to pivot with take up arms 51. A return spring 60 is secured between the baler chassis 11 and tension lever arm 55 to bias the shaft 52 and take up arms 51 toward the bale starting position (shown in FIG. 2) and move the take up arms toward the bale starting position following ejection of a completed bale. A hydraulic bale tension cylinder 56 is mounted between tailgate 13 and take up arms 51 and configured to resist movement of the take up arms from the bale starting position (FIG. 2) toward the full bale position (FIG. 3).

Rounds balers including belt take-up and tensioning apparatus of the aforementioned type are well known in the art. Exemplar take-up apparatus are described in U.S. Pat. Nos. 4,870,812 and 5,367,865, both to Jennings et al., each being incorporated herein by reference.

Now turning to FIGS. 4 through 7 to describe in further detail the novel apron tensioning system 100 at the heart of the present invention. The elements are shown just as the bale formation begins in FIG. 4, an intermediate bale formation position where the pre-tension system 100 is charged and ready for operation in FIG. 5, a full bale position just after the bale has been ejected in FIG. 6, and the apron pre-tensioning with the bale chamber in the empty, ready to begin bale formation position in FIG. 7.

Apron tensioning system 100 comprises a closed hydraulic loop including the hydraulic tension cylinder 56 acting on the take up arms 51 via belt tension lever arms 55. The hydraulic system includes hoses 107 supplying fluid to both high-side 101 (rod end) and low-side 103 (base end) sides of a piston 561 mounted on a rod 562 in cylinder 56, an adjustable relief valve 104 with a return free flow check valve 102. A pre-tension accumulator reservoir 110 is connected to the hose 107 by a solenoid-operated check valve 108, the check valve 108 being positionable to align a check valve or an open port allowing reverse flow (flow from the accumulator 110). The accumulator reservoir 110 is preferably a conventional gas-charged hydraulic accumulator with provisions for altering the gas pressure. A pressure indicator 120 is provided to allow an operator to adjust the relief valve 104 by an adjuster 105 to a desired pressure in the system 100 corresponding to a desired density of the resultant bales.

Figure 4:
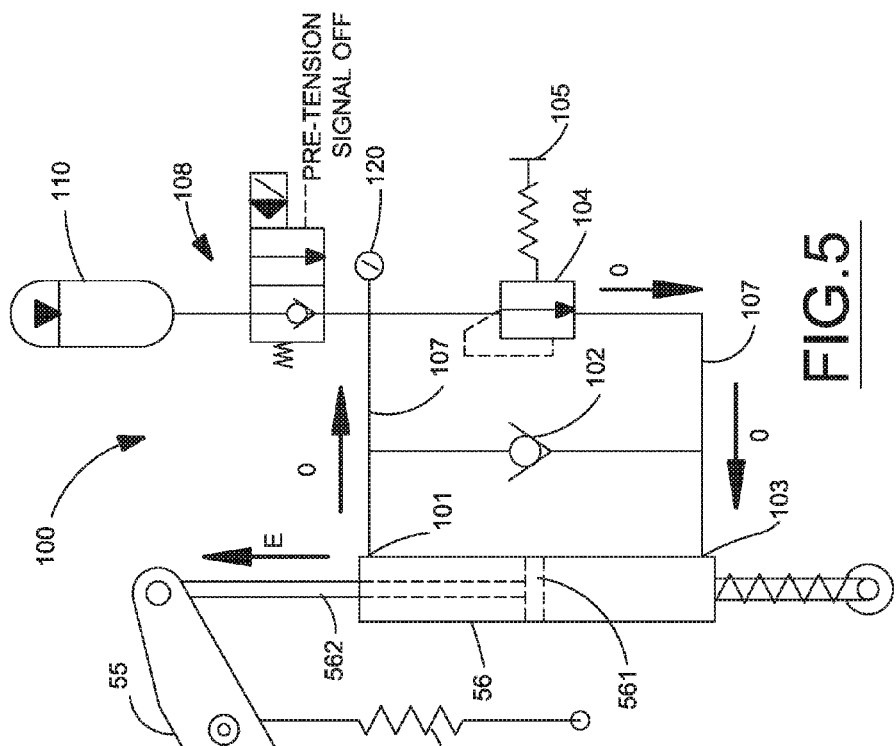
FIG. 4 is a diagrammatic view of a bale tension system incorporating the present invention shown configured as it would be during the initial bale formation in the chamber.

In FIG. 4, hydraulic fluid is forced from the high-side connection 101 into hoses 107 and the tension cylinder is extended in the direction of arrow E as the bale begins forming in the bale chamber. Charge pressure in the accumulator reservoir 110 is relatively low, so fluid passes through check valve 108 and increases the fluid volume and pressure in the reservoir 110, generally noted as oil flow path arrows O. As the forming bale expands, tension cylinder 56 extends in the direction of arrow E, continuing to force fluid into the system from the high-side 101 connection increasing pressure therein.

Figure 5:
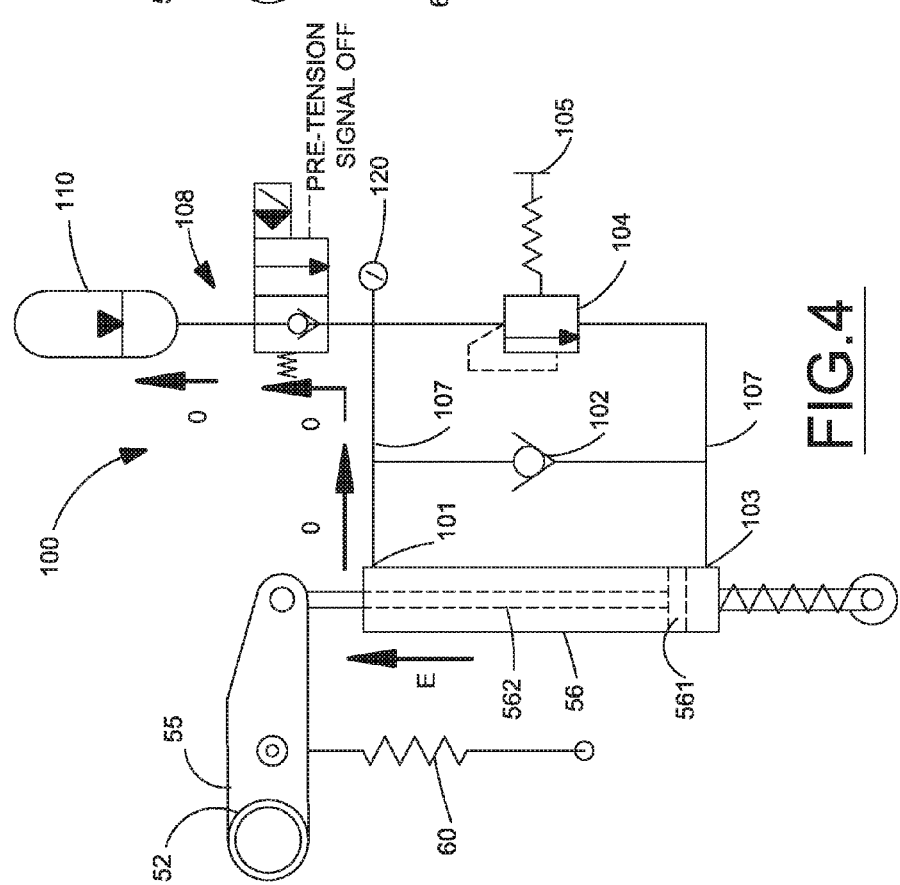
FIG. 5 is a diagrammatic view of a bale tension system incorporating the present invention shown configured as it would be as the bale formation is progressing (bale growth phase) and the accumulator has been fully charged.

In FIG. 5, the hydraulic pressure in system 100 has increased to the selected pressure setting of relief valve 104 which then allows fluid to pass from the high side 101 to the low-side 103 connection of the tension cylinder 56, shown as arrows O in the figure. Pressure in the accumulator reservoir 110 is maintained by operation of the check valve 108 which prevents blow-down of reservoir 110 to the low-side of the tension cylinder 56. It is to be noted that the range of set pressures for relief valve 104 must exceed the target pressure of the accumulator reservoir 110 in order for movement of the tension cylinder 56 to recharge the accumulator reservoir 110 prior to returning fluid to the low side 103 of the tension cylinder 56.

FIG. 6 shows the baler just after the bale has been ejected. Return spring 60 is returning belt tension lever arms 55 and take up arms 51 to the empty, or bale initiating position, and retracting tension cylinder 56 in the direction of arrow R. Hydraulic fluid pressure is now higher on the base end 103 than the rod end 101. Return check valve 102 allows fluid to pass from the higher pressure base end 103 to the lower pressure rod end 101 (oil flow arrows O) so that the tension cylinder 56 may be retracted.

In FIG. 7, the bale chamber is empty and ready to initiate the next bale cycle. A control signal is sent to solenoid operated check valve 108 to reposition the valve to the open alignment and allow the pressurized fluid in the accumulator reservoir 110 to be directed toward the high side (rod end) of the tension cylinder 56, again shown as oil flow arrows O. The increased pressure on the high side of tension cylinder 56 increases the retraction force on the belt tension lever arms 55 and take up arms 51 beyond that provided by return springs 60 thereby further increasing tension in the apron 40. The additional belt tension reduces the incidence of belt slipping, especially during the period when the drive roller 48 is working to initiate movement of the apron belts from rest, such as following bale ejection.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

Having thus described the invention, what is claimed is:
1. A tensioning apparatus comprising:
one or a plurality of belts operably connected to a tension arm pivotally movable between opposing empty, ready to begin bale formation position and full bale position;
a return spring biasing said tension arm toward said empty, ready to begin bale formation position;
at least one moveable roller operably connected to the one or plurality of belts for movement of said belts; and
a hydraulic actuator comprising a rod end and a base end, operably connected to said tension arm and in fluid communication with a hydraulic circuit, said hydraulic circuit comprising:
an accumulator reservoir;
an adjustable relief valve;
a pressure indicator for allowing an operator to adjust the relief valve by an adjuster to a desired pressure in the hydraulic circuit corresponding to a desired density of a bale;
a control valve; and
a return check valve,
wherein the adjustable relief valve is in series with the accumulator reservoir and the control valve within the hydraulic circuit, and in parallel to a return check valve within the hydraulic circuit.

2. The tensioning apparatus of claim 1, further comprising at least one operational mode in which hydraulic fluid flows from the rod end of the hydraulic actuator through the control valve and into the accumulator reservoir, filling said accumulator reservoir with hydraulic fluid and extending the hydraulic actuator.

3. The tensioning apparatus of claim 1, further comprising at least one operational mode in which hydraulic fluid flows from the rod end of the hydraulic actuator through the adjustable relief valve to the base end of the hydraulic actuator, further extending the hydraulic actuator.

4. The tensioning apparatus of claim 1, further comprising at least one operational mode in which hydraulic fluid flows from the base end of the hydraulic actuator through the return check valve to the rod end of the hydraulic actuator, retracting the hydraulic actuator.

5. The tensioning apparatus of claim 4, further comprising at least one operational mode in which hydraulic fluid flows from the accumulator reservoir through the control valve and into the rod end of the hydraulic actuator, further retracting the hydraulic actuator.

6. The tensioning apparatus of claim 5, wherein the control valve is operably connected to a controller, such that an operator can selectively activate the at least one operational mode, thereby releasing hydraulic fluid from the accumulator reservoir and applying retracting pressure to the hydraulic actuator in excess to the normal retracting pressure on the hydraulic actuator.

7. The tensioning apparatus of claim 1, wherein the control valve is configured to allow charging the accumulator reservoir with hydraulic fluid as the hydraulic actuator moves from a first position toward a second position, and discharge hydraulic fluid from said accumulator reservoir as said hydraulic actuator is returned to said first position.

8. The tensioning apparatus of claim 7, wherein said control valve is a solenoid operated check valve.

9. The tensioning apparatus of claim 1 further comprising:
a first operational mode in which hydraulic fluid flows from the rod end of the hydraulic actuator through the control valve and into the accumulator reservoir, filling said accumulator reservoir with hydraulic fluid and extending the hydraulic actuator;
a second operational mode in which in which hydraulic fluid flows from the rod end of the hydraulic actuator through the adjustable relief valve to the base end of the hydraulic actuator, further extending the hydraulic actuator;

a third operational mode in which in which hydraulic fluid flows from the base end of the hydraulic actuator through the return check valve to the rod end of the hydraulic actuator, retracting the hydraulic actuator; and a fourth operational mode in which hydraulic fluid flows from the accumulator reservoir through the control valve and into the rod end of the hydraulic actuator, further retracting the hydraulic actuator to a pressure greater than a pressure exerted by the hydraulic actuator in the absence of the control valve.

* * * * *